United States Patent
Pelz, Jr. et al.

[19]
[11] Patent Number: 5,970,188
[45] Date of Patent: Oct. 19, 1999

[54] METHOD AND APPARATUS FOR CONTROLLING AN OPTICAL SIGNAL

[75] Inventors: Lawrence James Pelz, Jr., Lenexa; Helin Ji; Xiaojun Fang, both of Lawrence, all of Kans.; Christopher Thomas Allen, Independence, Mo.; Kenneth Robert Demarest; Victor Samuel Frost, both of Lawrence, Kans.

[73] Assignee: Sprint Communications Company L.P., Kansas City, Mo.

[21] Appl. No.: 08/879,527

[22] Filed: Jun. 20, 1997

[51] Int. Cl.[6] ............................... G02B 6/26; G01B 9/02
[52] U.S. Cl. .................... 385/27; 385/1; 385/2; 385/3; 385/11; 385/9; 385/15; 385/16; 385/41; 385/42; 356/345
[58] Field of Search .................... 385/1, 2, 3, 11, 385/8, 9, 14, 15, 16, 31, 41, 42, 27; 356/345, 350, 351, 365

[56] References Cited

U.S. PATENT DOCUMENTS

| | | | |
|---|---|---|---|
| 5,031,236 | 7/1991 | Hodgkinson et al. | 359/24 X |
| 5,136,667 | 8/1992 | Ohno et al. | 385/11 |
| 5,757,529 | 5/1998 | Desurvire et al. | 359/179 |
| 5,760,948 | 6/1998 | Bigo | 359/326 |
| 5,857,040 | 1/1999 | Bigo et al. | 385/15 |

*Primary Examiner*—Brian Healy
*Attorney, Agent, or Firm*—Duft, Graziano & Forest P.C.

[57] ABSTRACT

The invention is a method and apparatus that provides for the control of optical signals in a polarization-independent manner using birefringence. The invention includes an optical coupler connected to a birefringence element by an optical path loop. The optical coupler and optical path loop could be a Sagnac interferometer. The birefringence element affects the phase velocity of optical signals based on a control signal, and it can introduce a relative phase shift between optical signals propagating around the loop. The optical signals can be routed based on this phase shift.

95 Claims, 4 Drawing Sheets

METHOD AND APPARATUS FOR CONTROLLING AN OPTICAL SIGNAL

RELATED APPLICATIONS

Not applicable

FEDERALLY SPONORED RESEARCH OR DEVELOPMENT

Not applicable

MICROFICHE APPENDIX

Not applicable

BACKGROUND OF THE INVENTION

1. Field of the Invention

The invention is related to optical signal control, and in particular, to using birefringence to control the output of an optical coupler.

2. Description of the Prior Art

High speed optical switches and wavelength routers are two very important components in broadband optical networks. Polarization independence is very important for these components, because the polarization of optical signals at remote nodes of an optical network is usually random.

Technologies currently enjoying widespread use for multi-gigabit per second modulation include the Mach-Zehnder modulator (MZM) and the electroabsorption modulator. The lithium-niobate based MZM is a low-loss broadband device based on the Pockels effect. This device is not polarization independent. It requires linearly polarized optical signals with the polarization direction aligned to the principal axis of the MZM. This dependence on linear polarization poses a serious constraint in network functions because of the random polarization of these optical signals. A polarization-independent MZM has been demonstrated, but the complex structure and high drive voltage make them hard to implement. The second limitation of the MZM is that the wavelength dependence of its transfer function when used as a tunable filter is always sinusoidal.

At present there is a need for an optical device that is polarization independent, and that can be controlled at ultra high speeds with a reasonable voltage.

SUMMARY OF THE INVENTION

The invention is an optical device and method for controlling an optical signal. The device comprises: an optical coupler; a birefringence element, a first optical path, and a second optical path. The optical paths connect the optical coupler to the birefringence element to form a loop. The birefringence element controls the optical signal based on a control input.

In some embodiments, the optical coupler receives and splits the optical signal into at least a first portion and a second portion. The optical coupler provides the first portion of the optical signal to the first optical path and provides the second portion of the optical signal to the second optical path. The first portion of the optical signal is substantially equal in intensity to the second portion of the optical signal. The birefringence element applies a 180° phase offset or a 0° phase offset to the portions of the optical signal based on the control input. The optical coupler receives the second portion of the optical signal from the first optical path after it has passed through the birefringence element, and receives the first portion of the optical signal from the second optical path after it has passed through the birefringence element. The optical coupler returns the optical signal back to an input optical path if the portions have a phase offset of 0°, and the optical coupler routes the optical signal to an output optical path if the portions have a phase offset of 180°.

DETAILED DESCRIPTION OF THE PREFERRED EMBODIMENT

The invention is a method and apparatus that provides for the control of optical signals in a polarization-independent manner using birefringence. Birefringence is a characteristic where the refractive index causes different polarizations of optical signals to experience different phase velocities. A medium that has this characteristic displays birefringence. As will be discussed below, this characteristic can be used to control the relative phases of optical signals.

Figure 1:
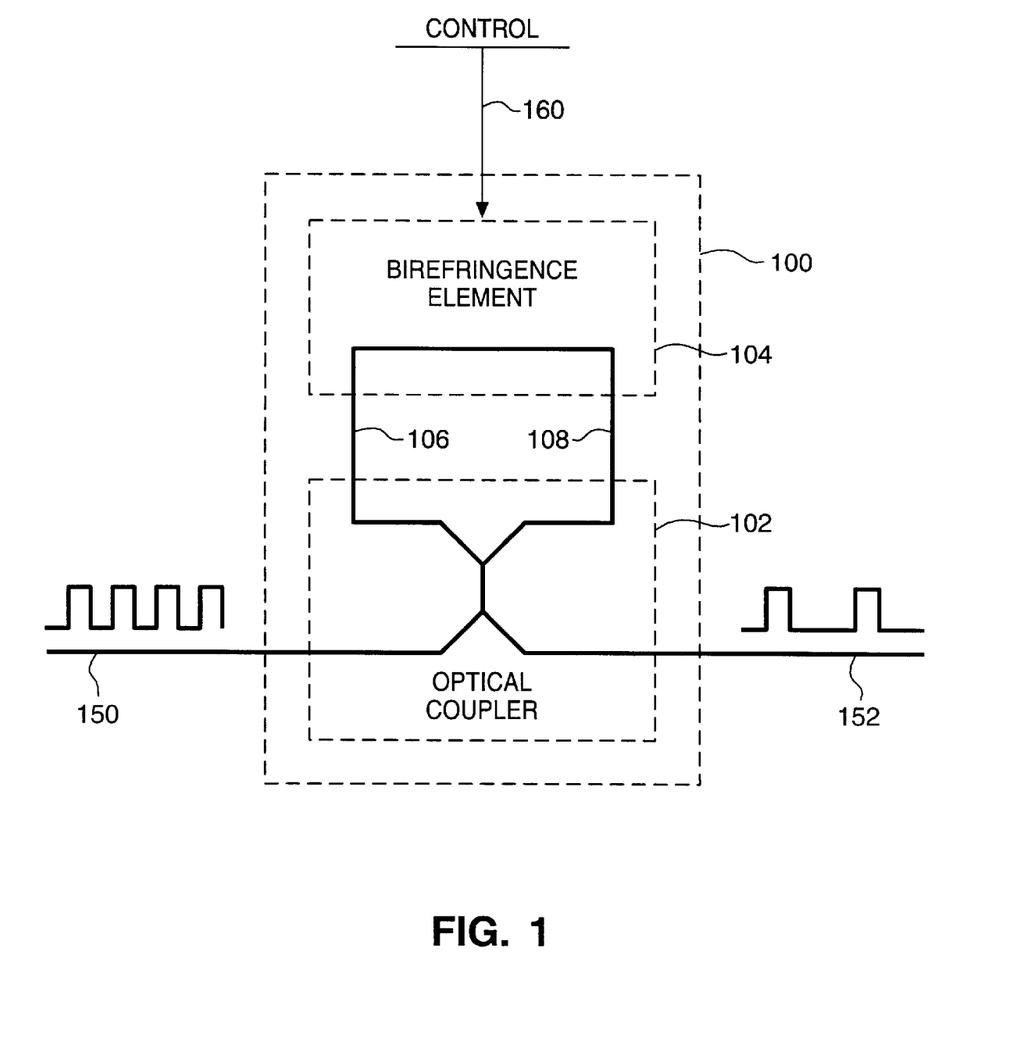
FIG. 1 is a block diagram of a version of the invention.

FIG. 1 depicts a block diagram of a version of the invention. Shown is optical device 100 that is comprised of optical coupler 102 and birefringence element 104. Optical coupler 102 is connected to birefringence element 104 by an optical path loop depicted by optical path 106 and optical path 108. Optical device 100 accepts external inputs from optical path 150, optical path 152, and control input 160. Optical paths 106, 108, 150, and 152 could be standard optical waveguides or fibers that transport optical signals. Birefringence element 104 could be a standard birefringence modulator. Optical coupler 102 could be a standard optical coupler. The above components are known in the art, but they have not previously been combined to operate as described below.

In operation, optical signals on optical path 150 are provided to optical coupler 102. Optical coupler 102 splits the optical signal and provides a portion of the optical signal to optical path 106 and a portion of the optical signal to optical path 108. (Typically, this split is 50/50 with half of the intensity of the optical signal being provided to each optical path.) Birefringence element 104 accepts each portion of the optical signals from optical paths 106 and 108 and controls the phase of the portions of the signals based on control input 160. Phase control is exerted through a property of birefringence that affects the phase velocity of the optical signal. Typically, control input 160 is a modulated electrical signal.

Once the portion of the optical signal from optical path 106 passes through birefringence element 104, it is returned to optical coupler 102 over optical path 108. Once the portion of the optical signal from optical path 108 passes through birefringence element 104, it is returned to optical coupler 102 over optical path 106. Optical coupler 102 will provide the optical signal to optical path 150 and/or optical path 152 based on the phase control applied by birefringence element 104. If the phases of the portions of the optical signal are offset by 180°, then the optical signal propagates to optical path 152. If the phases of the portions of the optical signal are offset by 0°, then the optical signal returns to optical path 150. Phase offsets between 0° and 180° cause the optical signal to be distributed to both optical paths. One skilled in the art will appreciate that a 180° phase shift by the birefringence element is similar to the phase effect of a half-wave plate.

It can be appreciated from the above discussion that control can be exerted over the optical signal output from optical device 100. By applying the proper phase control in birefringence element 104, the optical signal to optical path 152 can be turned off if the phases are offset by 0°. The optical signal is passed to optical path 152 if the phases are offset by 180°. This effectively forms an optical switch.

It is important to note that control input 160 can be exerted electronically at very high speeds (although low speed or DC control could also be used). The high-speed electronic control allows optical device 100 to control high speed optical signals. For example, a 20-GHz microwave control signal could be used. By selecting the proper control input, optical signals at particular wavelengths can be selected and controlled. This feature could be used to route wavelengths in a wave-division-multiplex device. It should also be noted that the source of the control signal could be incorporated within the modulator if desired.

Polarization is a well known property of optical signals. Polarization characterizes the temporal and spatial properties of the electrical field of the optical signal. It is important to note that optical device 100 is polarization independent. This means that optical device 100 can control optical signals regardless of their particular polarization. Most optical devices are not polarization independent, and they only process optical signals at a particular polarization. Unpolarized optical signals are degraded by such devices. One skilled in the art will appreciate advantages provided by polarization independence.

It can be appreciated by one skilled in the art that optical device 100 could be useful in many devices and applications. For example, optical device 100 could be used for optical switches, wavelength routers, and intensity modulators.

FIG. 1 will now be discussed with reference to a particular version of the invention, but it should be noted that the invention is not restricted only to this version. Optical device 100 could be comprised of a Sagnac interferometer that contains an active birefringence modulator. The Sagnac interferometer is represented by optical coupler 102 and the optical path loop created by optical paths 106 and 108. Optical coupler 102 could be a low-loss 3-dB coupler. Birefringence element 104 could be a birefringence modulator that is configured as a uniaxial phase modulator. A uniaxial phase modulator alters the phase of an optical signal along a particular axis of modulation.

The birefringence modulator uses the refractive index to control the phase velocities of optical signals along a particular axis of polarization. Controlling phase velocities allows the phases of two optical signals to be shifted relative to one another along a particular axis of polarization. If the phase velocities of optical signals are controlled along the principle axes of polarization, then the phase of one optical signal can be effectively shifted relative to the phase of another optical signal. This creates a phase offset between the two optical signals.

The intensity transfer function of optical device 100 is given by:

$$T=(Im(B))^2$$

where Im(B) is the imaginary component of the off-diagonal term of the Jones matrix of the birefringence. Assume that the principle axes of the Sagnac interferometer are in the X-Z plane with light propagating along the Z axis and that the principle axes of the birefringence modulator are in the X-Y plane. The principle axes of the birefringence modulator can be aligned 45° relative to the X-Y axes of the Sagnac interferometer. This 45° alignment allows the birefringence modulator to apply consistent phase control to each of the principle axes of polarization of the optical signal. The intensity transfer function of optical device 100 with this 45° alignment is given by the following:

$$T=\sin^2(\phi(t)/2)$$

where $\phi(t)$ is the phase retardation of the optical signal along the principle axes of birefringence modulator 104. Phase retardation is the difference in the phase shifts between orthogonal polarization components.

If the phase retardation is modulated, the intensity transfer function will be modulated accordingly. This means the optical output of optical device 100 can be driven by a modulated electrical signal provided as control input 160. This feature allows optical signals at particular wavelengths to be selected and controlled.

Birefringence can be controlled through Pockels effect, Kerr effect, photoelastic stress, or liquid crystals. Those skilled in the art will appreciate other techniques to control birefringence. Typically, Pockels effect is used because it can be applied at low voltage and has a high response speed. Pockels effect is related to the 2nd order term of a Taylor series expansion of the index of refraction as a function of the electrical field. Commercial lithium-niobate based modulators using Pockels effect devices can currently operate at 20 GHz with reasonable half-wave voltage.

It can be seen by the above equations that the intensity transfer function can be controlled by controlling the phase retardation. Phase retardation can be controlled by controlling the birefringence using Pockels effect. The Pockels effect can be induced by control input 160. As a result, the intensity transfer function of optical device 100 for an optical signal is controlled by control input 160. This means that unpolarized optical signals can be either passed or reflected by optical device 100 based on control input 160. This control can be asserted at high speeds and affecting particular wavelengths if desired.

Figure 2:
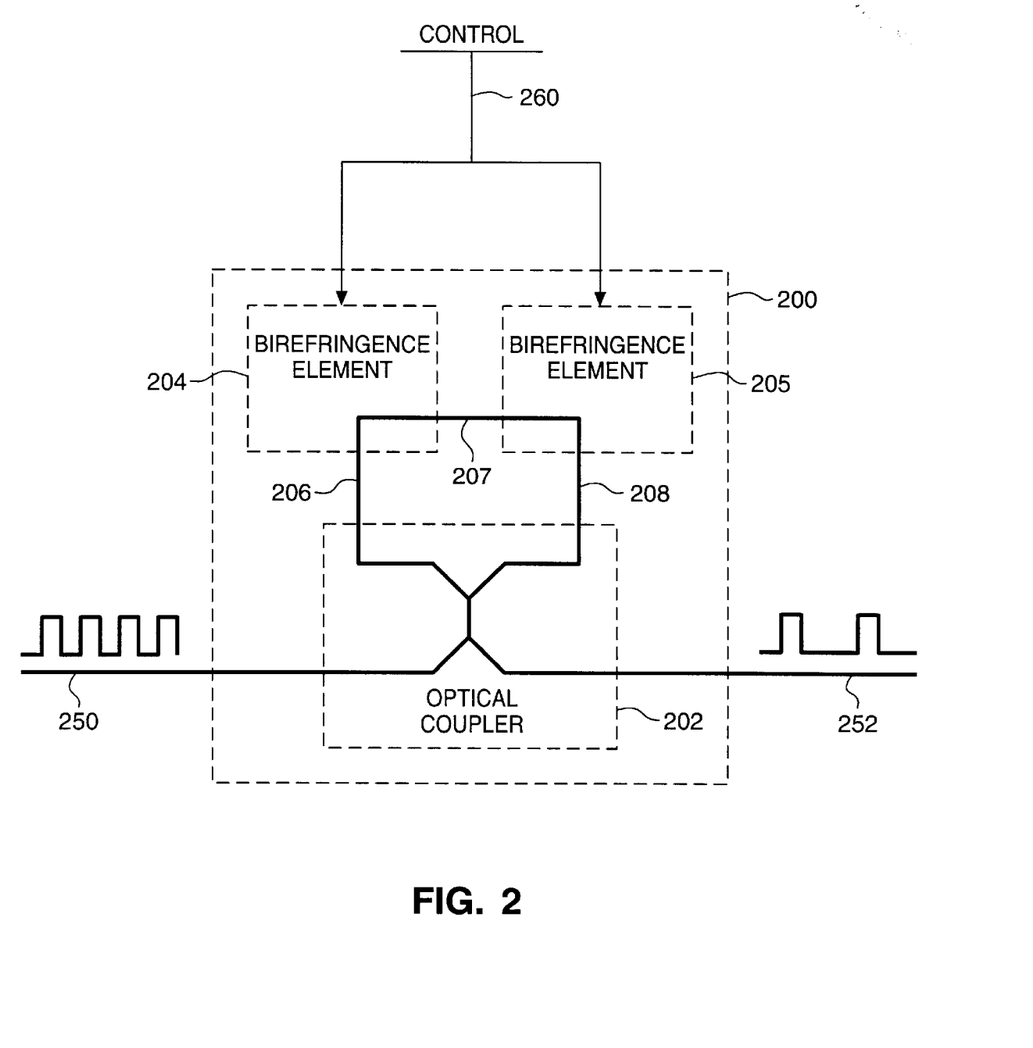
FIG. 2 is a block diagram of a version of the invention.

FIG. 2 shows another version of the invention. Shown are: optical device 200, optical coupler 202, control input 260, optical path 206, optical path 208, optical path 250, and optical path 252. These elements can be similar to corresponding elements from FIG. 1. The two inputs shown for control input 260 could be different or the same. Also shown are birefringence element 204 and birefringence element 205 which are connected by optical path 207. If high-frequency signals are used as control inputs, traveling wave effects interact with the optical signal. This can destroy the symmetry of modulator 200. To counter this effect, two unidirectional birefringence elements are used. Birefringence element 204 operates primarily on optical signals propagating in the counter-clockwise direction, and birefringence element 205 operates primarily on optical signals propagating in the clockwise direction (although each element still has a negligible effect on the other signal). This configuration balances the modulator 200.

Balancing is important to maintain polarization independence. This becomes necessary due to the traveling wave effects of high speed control signals. In order to exert high-speed control, it is desirable to match the velocity and direction of the control signal and the optical signal. This match can only occur in one direction. With only one birefringence element, the control signal will not be able to match the direction of both optical signals since they are propagating in opposite directions. With two birefringence elements, one of the birefringence elements can be configured to match the velocity and direction of the control signal with that of the optical signal propagating in one direction, and the other birefringence element can be configured to match the velocity and direction of the control signal with that of the optical signal propagating in the other direction.

Figure 3:
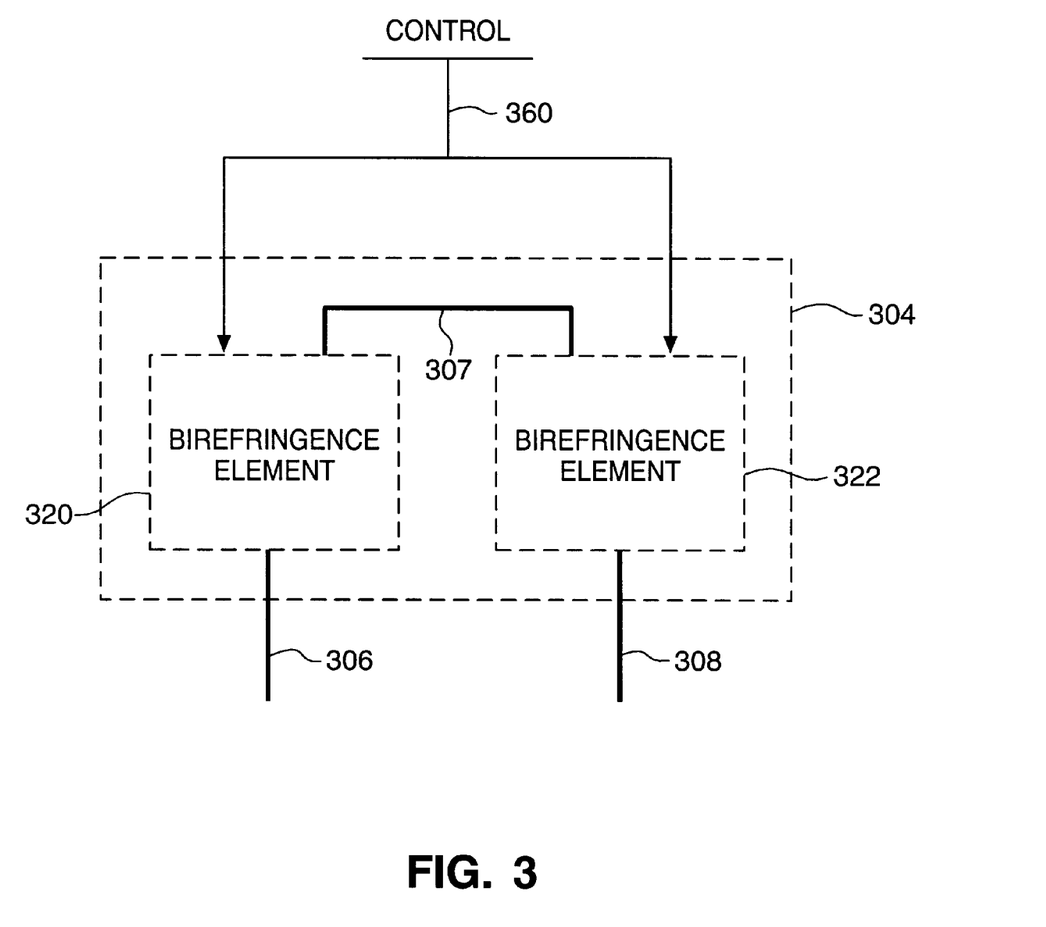
FIG. 3 is a block diagram of a version of the invention.

FIG. 3 shows a particular birefringence device that is another version of the invention. Birefringence device 304 is shown and is comprised of birefringence element 320 and birefringence element 322 which are connected by optical path 307. Also shown are the external connections. Optical path 306 and optical path 308 provide the loop from the optical coupler. Control input 360 controls birefringence element 320 and birefringence element 322. Birefringence element 320 and birefringence element 322 are each unidirectional birefringence modulators incorporated into a single birefringence device. Birefringence element 320 operates on optical signals propagating in the counterclockwise direction, and birefringence element 322 operates on optical signals propagating in the clockwise direction. A birefringence device with this construction is not currently available.

Figure 4:
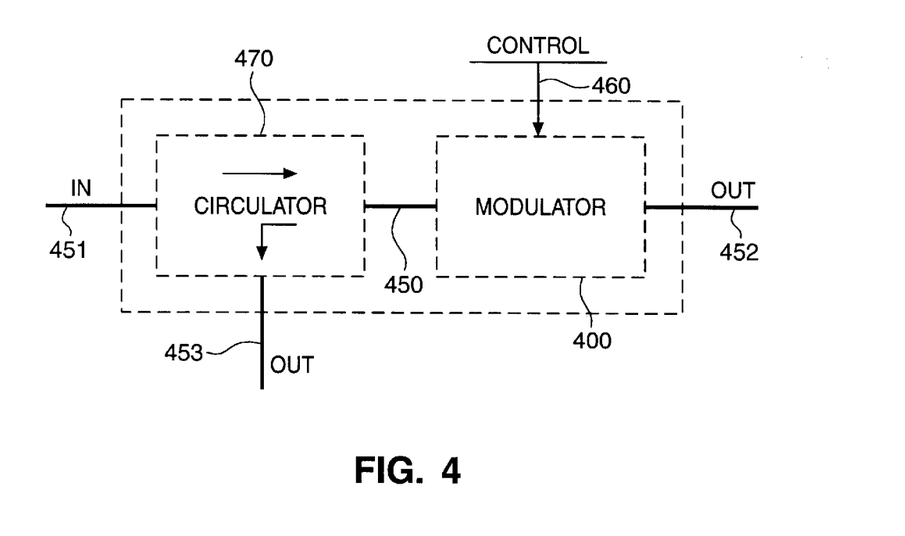
FIG. 4 is a block diagram of a version of the invention.

FIG. 4 shows another version of the invention. Shown is modulator 400, optical path 450, optical path 452, and control input 460. These elements operate as described above for the corresponding elements of FIGS. 1–3 (with modulator 400 representing optical devices 100 and 200). Also shown are circulator 470, optical path 451, and optical path 453. Circulators are well known and pass optical signals in particular directions. Circulator 470 passes optical signals from optical path 451 to optical path 450, and also passes optical signals from optical path 450 to optical path 453. Optical signals that are provided to modulator 400 over optical paths 451 and 450 may be reflected by modulator 400 (through a 0° phase offset) and returned to optical path 450. Circulator 470 passes these optical signals to optical path 453. Optical signals that are provided to modulator 400 over optical path 450 may be passed by modulator 400 (through a 180° phase offset) to optical path 452. As a result, a 1×2 optical switch is created. Optical signals input to optical path 451 may be connected to either optical path 452 or optical path 453 based on control input 460.

Figure 5:
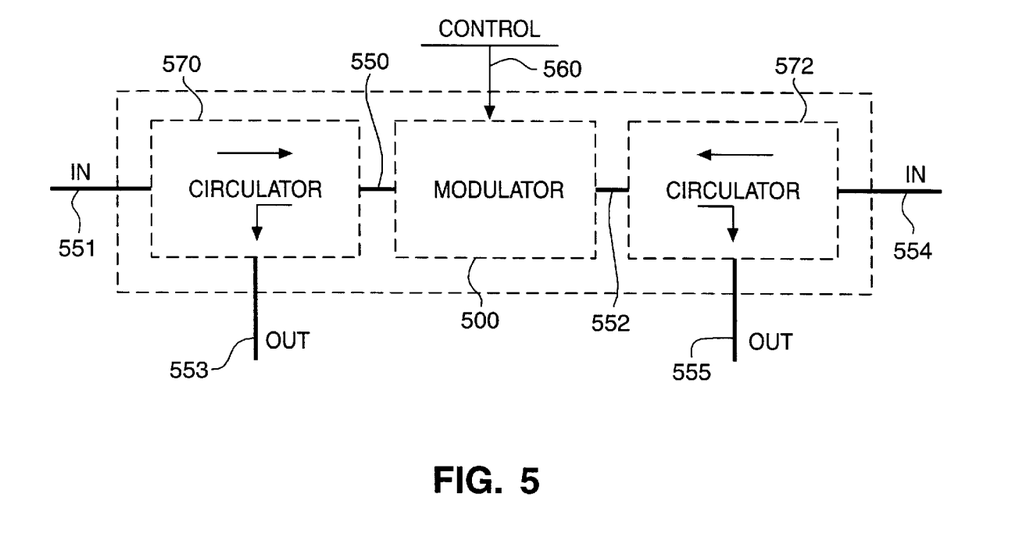
FIG. 5 is a block diagram of a version of the invention.

FIG. 5 is similar to FIG. 4 except that circulator 572 has been added along with optical paths 554 and 555. Circulator 572 passes signals from optical path 552 to optical path 555 and passes signals from optical path 554 to optical path 552. Optical signals that are provided to modulator 500 over optical paths 551 and 550 may be reflected by modulator 500 (through a 0° phase offset) and returned to optical path 550. Circulator 570 passes these optical signals to optical path 553. Optical signals that are provided to modulator 500 over optical paths 551 and 550 may be passed by modulator 500 (through a 180° phase offset) to optical path 552. Circulator 572 passes these optical signals to optical path 555. Optical signals that are provided to modulator 500 over optical paths 554 and 552 may be reflected by modulator 500 (through a 0° phase offset) and returned to optical path 552. Circulator 572 passes these optical signals to optical path 555. Optical signals that are provided to modulator 500 over optical paths 554 and 552 may be passed by modulator 500 (through a 180° phase offset) to optical path 550. Circulator 570 passes these optical signals to optical path 553. As a result, a 2×2 optical switch is created. Optical signals input to optical path 551 or 554 may be connected to either optical path 553 or optical path 555 based on control input 560.

The invention allows optical signals to be controlled in a polarization independent manner. Control can be exerted electronically. By controlling the birefringence, the invention can introduce phase shifts to particular optical signals. The phase shifts allow the invention to turn an optical signal on or off using electronic control. Optical signals with particular wavelengths can be selected and controlled in a similar manner. The invention should not be restricted to particular examples given above, but should be measured by the following claims.

We claim:

1. An optical device for controlling an optical signal that comprises:

an optical coupler;

a birefringence element that is operational to control the optical signal based on a control input;

a first optical path that connects the optical coupler to the birefringence element; and a second optical path that connects the optical coupler to the birefringence element wherein a loop is formed comprised of the optical coupler, the first optical path, the birefringence element, and the second optical path;

wherein the optical coupler, the first optical path, and the second optical path comprise a Sagnac interferometer.

2. The optical device of claim 1 wherein the optical coupler is operational to receive and split the optical signal into at least a first portion and a second portion, and to provide the first portion of the optical signal to the first optical path and to provide the second portion of the optical signal to the second optical path.

3. The optical device of claim 2 wherein the first portion of the optical signal is substantially equal in intensity to the second portion of the optical signal.

4. The optical device of claim 1 wherein the optical coupler is operational to receive the second portion of the optical signal from the first optical path after it has passed through the birefringence element and to receive the first portion of the optical signal from the second optical path after it has passed through the birefringence element, wherein the optical coupler is operational return the optical signal back to an input optical path if the portions have a phase offset of 0°, and wherein the optical coupler is operational route the optical signal to an output optical path if the portions have a phase offset of 180°.

5. The optical device of claim 1 wherein the first optical path and the second optical path are optical waveguides.

6. The optical device of claim 1 wherein the birefringence element is a birefringence modulator.

7. The optical device of claim 1 wherein the birefringence element is operational to control the phase shift of the optical signal based on the control input.

8. The optical device of claim 1 wherein the birefringence element is operational to apply a 180° phase offset to the portions of the optical signal based on the control input.

9. The optical device of claim 1 wherein the birefringence element is operational to apply a 0° phase offset to the portions of the optical signal based on the control input.

10. The optical device of claim 1 wherein the birefringence element is a uniaxial phase modulator.

11. The optical device of claim 1 wherein the birefringence element is a uniaxial phase modulator with principle axes that are aligned 45° from the axes of the loop.

12. The optical device of claim 1 wherein the birefringence element is a lithium-niobate based modulator.

13. The optical device of claim 1 wherein the birefringence element is controlled based on Pockels effect.

14. The optical device of claim 1 wherein the birefringence element is comprised of two unidirectional birefringence modulators.

15. The optical device of claim 1 wherein the control signal is an electronic signal.

16. The optical device of claim 1 wherein the control signal is a modulated electronic signal.

17. The optical device of claim 1 wherein the control signal is a microwave signal.

18. The optical device of claim 1 wherein the optical device comprises an optical switch.

19. The optical device of claim 1 wherein the optical device comprises a wavelength router.

20. The optical device of claim 1 further comprising an optical circulator connected to the optical coupler.

21. The optical device of claim 20 that is operational to provide a 1×2 optical switch.

22. The optical device of claim 20 further comprising another optical circulator connected to the optical coupler.

23. The optical device of claim 22 that is operational to provide a 2×2 optical switch.

24. A birefringence device that comprises:
    a first birefringence element that is operational to receive a first optical signal and control the phase of the first optical signal based on a first control input;
    a second birefringence element that is operational to receive a second optical signal and control the phase of the second optical signal based on a second control input; and
    an optical path that connects the first birefringence element to the second birefringence element.

25. The birefringence device of claim 24 wherein the first birefringence element and the second birefringence element are balanced.

26. A method for controlling an optical signal that comprises:
    receiving an optical signal into an optical coupler;
    splitting the optical signal into at least a first portion and a second portion and providing the first portion of the optical signal to a first optical path and providing the second portion of the optical signal to a second optical path;
    transporting the first portion of the optical signal to a birefringence element over the first optical path and transporting the second portion of the optical signal to the birefringence element over the second optical path;
    applying a phase offset to the portions of the optical signal in the birefringence element based on a control input and then providing the first portion of the optical signal to the second optical path and providing the second portion of the optical signal to the first optical path;
    in the optical coupler, receiving the first portion of the optical signal from the second optical path after it has passed through the birefringence element and receiving the second portion of the optical signal from the first optical path after it has passed through the birefringence element; and
    in the optical coupler, routing the optical signal based on the phase offset applied by the birefringence element.

27. The method of claim 26 wherein splitting the optical signal comprises splitting the optical signal into substantially equal portions.

28. The method of claim 26 wherein the phase offset is 180°.

29. The method of claim 26 wherein the phase offset is 0°.

30. The method of claim 26 wherein applying the phase offset uses the Pockels effect.

31. The method of claim 24 wherein the control signal is an electronic signal.

32. The method of claim 24 wherein the control signal is an modulated electronic signal.

33. An optical device for controlling an optical signal that comprises:
    an optical coupler;
    a birefringence element that is operational to control the optical signal based on a control input;
    a first optical path that connects the optical coupler to the birefringence element; and
    a second optical path that connects the optical coupler to the birefringence element wherein a loop is formed comprised of the optical coupler, the first optical path, the birefringence element, and the second optical path;
    wherein the birefringence element is comprised of two unidirectional birefringence modulators.

34. The optical device of claim 33 wherein the optical coupler is operational to receive and split the optical signal into at least a first portion and a second portion, and to provide the first portion of the optical signal to the first optical path and to provide the second portion of the optical signal to the second optical path.

35. The optical device of claim 34 wherein the first portion of the optical signal is substantially equal in intensity to the second portion of the optical signal.

36. The optical device of claim 33 wherein the optical coupler is operational to receive the second portion of the optical signal from the first optical path after it has passed through the birefringence element and to receive the first portion of the optical signal from the second optical path after it has passed through the birefringence element, wherein the optical coupler is operational return the optical signal back to an input optical path if the portions have a phase offset of 0°, and wherein the optical coupler is operational route the optical signal to an output optical path if the portions have a phase offset of 180°.

37. The optical device of claim 33 wherein the first optical path and the second optical path are optical waveguides.

38. The optical device of claim 33 wherein the birefringence element is a birefringence modulator.

39. The optical device of claim 33 wherein the birefringence element is operational to control the phase shift of the optical signal based on the control input.

40. The optical device of claim 33 wherein the birefringence element is operational to apply a 180° phase offset to the portions of the optical signal based on the control input.

41. The optical device of claim 33 wherein the birefringence element is operational to apply a 0° phase offset to the portions of the optical signal based on the control input.

42. The optical device of claim 33 wherein the birefringence element is a uniaxial phase modulator.

43. The optical device of claim 33 wherein the birefringence element is a uniaxial phase modulator with principle axes that are aligned 45° from the axes of the loop.

44. The optical device of claim 33 wherein the birefringence element is a lithium-niobate based modulator.

45. The optical device of claim 33 wherein the birefringence element is controlled based on Pockels effect.

46. The optical device of claim 33 wherein the control signal is an electronic signal.

47. The optical device of claim 33 wherein the control signal is a modulated electronic signal.

48. The optical device of claim 33 wherein the control signal is a microwave signal.

49. The optical device of claim 33 wherein the optical device comprises an optical switch.

50. The optical device of claim 33 wherein the optical device comprises a wavelength router.

51. The optical device of claim 33 further comprising an optical circulator connected to the optical coupler.

52. The optical device of claim 51 that is operational to provide a 1×2 optical switch.

53. The optical device of claim 51 further comprising another optical circulator connected to the optical coupler.

54. The optical device of claim 53 that is operational to provide a 2×2 optical switch.

55. An optical device for controlling an optical signal that comprises:
- an optical coupler;
- a birefringence element that is operational to control the optical signal based on a control input;
- a first optical path that connects the optical coupler to the birefringence element; and
- a second optical path that connects the optical coupler to the birefringence element wherein a loop is formed comprised of the optical coupler, the first optical path, the birefringence element, and the second optical path;
- wherein the control signal is a microwave signal.

56. The optical device of claim 55 wherein the optical coupler is operational to receive and split the optical signal into at least a first portion and a second portion, and to provide the first portion of the optical signal to the first optical path and to provide the second portion of the optical signal to the second optical path.

57. The optical device of claim 56 wherein the first portion of the optical signal is substantially equal in intensity to the second portion of the optical signal.

58. The optical device of claim 55 wherein the optical coupler is operational to receive the second portion of the optical signal from the first optical path after it has passed through the birefringence element and to receive the first portion of the optical signal from the second optical path after it has passed through the birefringence element, wherein the optical coupler is operational return the optical signal back to an input optical path if the portions have a phase offset of 0°, and wherein the optical coupler is operational route the optical signal to an output optical path if the portions have a phase offset of 180°.

59. The optical device of claim 55 wherein the first optical path and the second optical path are optical waveguides.

60. The optical device of claim 55 wherein the birefringence element is a birefringence modulator.

61. The optical device of claim 55 wherein the birefringence element is operational to control the phase shift of the optical signal based on the control input.

62. The optical device of claim 55 wherein the birefringence element is operational to apply a 180° phase offset to the portions of the optical signal based on the control input.

63. The optical device of claim 55 wherein the birefringence element is operational to apply a 0° phase offset to the portions of the optical signal based on the control input.

64. The optical device of claim 55 wherein the birefringence element is a uniaxial phase modulator.

65. The optical device of claim 55 wherein the birefringence element is a uniaxial phase modulator with principle axes that are aligned 45° from the axes of the loop.

66. The optical device of claim 55 wherein the birefringence element is a lithium-niobate based modulator.

67. The optical device of claim 55 wherein the birefringence element is controlled based on Pockels effect.

68. The optical device of claim 55 wherein the control signal is an electronic signal.

69. The optical device of claim 55 wherein the control signal is a modulated electronic signal.

70. The optical device of claim 55 wherein the optical device comprises an optical switch.

71. The optical device of claim 55 wherein the optical device comprises a wavelength router.

72. The optical device of claim 55 further comprising an optical circulator connected to the optical coupler.

73. The optical device of claim 72 that is operational to provide a 1×2 optical switch.

74. The optical device of claim 72 further comprising another optical circulator connected to the optical coupler.

75. The optical device of claim 74 that is operational to provide a 2×2 optical switch.

76. An optical device for controlling an optical signal that comprises:
- an optical coupler;
- a birefringence element that is operational to control the optical signal based on a control input;
- a first optical path that connects the optical coupler to the birefringence element;
- a second optical path that connects the optical coupler to the birefringence element wherein a loop is formed comprised of the optical coupler, the first optical path, the birefringence element, and the second optical path; and
- an optical circulator connected to the optical coupler,
- the control signal is a microwave signal.

77. The optical device of claim 76 wherein the optical coupler is operational to receive and split the optical signal into at least a first portion and a second portion, and to provide the first portion of the optical signal to the first optical path and to provide the second portion of the optical signal to the second optical path.

78. The optical device of claim 77 wherein the first portion of the optical signal is substantially equal in intensity to the second portion of the optical signal.

79. The optical device of claim 76 wherein the optical coupler is operational to receive the second portion of the optical signal from the first optical path after it has passed through the birefringence element and to receive the first portion of the optical signal from the second optical path after it has passed through the birefringence element, wherein the optical coupler is operational return the optical signal back to an input optical path if the portions have a phase offset of 0°, and wherein the optical coupler is operational route the optical signal to an output optical path if the portions have a phase offset of 180°.

80. The optical device of claim 76 wherein the first optical path and the second optical path are optical waveguides.

81. The optical device of claim 76 wherein the birefringence element is a birefringence modulator.

82. The optical device of claim 76 wherein the birefringence element is operational to control the phase shift of the optical signal based on the control input.

83. The optical device of claim 76 wherein the birefringence element is operational to apply a 180° phase offset to the portions of the optical signal based on the control input.

84. The optical device of claim 76 wherein the birefringence element is operational to apply a 0° phase offset to the portions of the optical signal based on the control input.

85. The optical device of claim 76 wherein the birefringence element is a uniaxial phase modulator.

86. The optical device of claim 76 wherein the birefringence element is a uniaxial phase modulator with principle axes that are aligned 45° from the axes of the loop.

87. The optical device of claim 76 wherein the birefringence element is a lithium-niobate based modulator.

88. The optical device of claim 76 wherein the birefringence element is controlled based on Pockels effect.

89. The optical device of claim 76 wherein the control signal is an electronic signal.

90. The optical device of claim 76 wherein the control signal is a modulated electronic signal.

91. The optical device of claim 76 wherein the optical device comprises an optical switch.

92. The optical device of claim 76 wherein the optical device comprises a wavelength router.

93. The optical device of claim 76 that is operational to provide a 1×2 optical switch.

94. The optical device of claim 76 further comprising another optical circulator connected to the optical coupler.

95. The optical device of claim 94 that is operational to provide a 2×2 optical switch.

* * * * *